Patented May 24, 1938

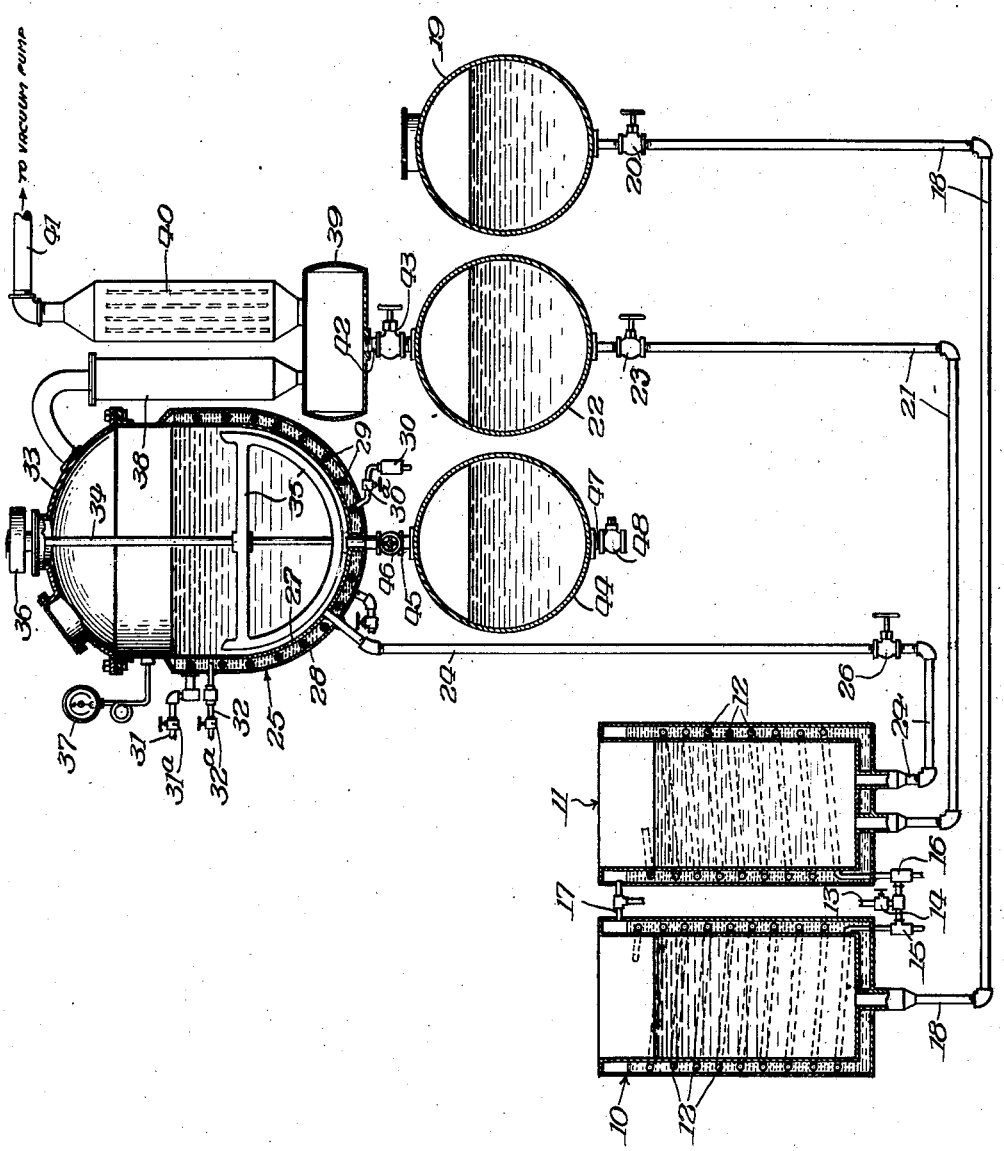

2,118,036

UNITED STATES PATENT OFFICE 2,118,036

PROCESS OF REMOVING SURPLUS RESINS FROM ARTICLES AFTER IMPREGNATION

Philip C. P. Booty and Raymond G. Booty, Chicago, Ill.

Application April 11, 1935, Serial No. 15,901

13 Claims. (Cl. 91—70)

Our invention relates to the removal of surplus resin from the surfaces of articles of wood or other fibrous material after having been coated or impregnated with the resin and to the recovery of the resin for further impregnating purposes, and it has for its object the provision of a new and improved process for effecting these results in such manner as to leave the articles being treated in condition for effective curing of the resin. Our process relates particularly to the removal and recovery of the resin in connection with the impregnation of articles by the use of a synthetic resin preferably of the phenol-formaldehyde type adapted to be made hard and insoluble by curing, such resin in the impregnating operation being preferably carried into the pores of the fibrous material by means of a suitable liquid vehicle preferably comprising water and an alcohol of low molecular weight and adapted to retard polymerization of the resin until the articles are ready for the curing treatment. Such a resin is sometimes referred to in this art as "A type" resin.

In order to carry out successfully the operation of impregnating wood or the like with a resin of this type and subsequently curing the resin in the wood, it is necessary that the resin be prevented from frothing during the curing operation, since by any frothing action a portion of the resin at least is expelled from the wood and any effective sealing of the surface of the wood by the resin remaining in the wood is prevented by the passage of the escaping resin through the sealing zone while the curing is taking place. In order to prevent frothing of the resin, it has been usual heretofore to carry out the curing operation in a heated chamber or oven in which a comparatively high air pressure is maintained, the necessity for maintaining such air pressure limiting the size of the oven that may be used and increasing both its initial cost and the cost of operating it, serving to prevent any effective inspection of the articles in the oven during the curing operation, making it necessary that the articles quick to cure remain in the oven for the same length of time as those requiring a much longer period for effective curing, preventing the simultaneous use of the oven for other related operations such as drying the articles preparatory to the impregnating operation, and adding substantially to the expense of carrying out the process. It is the object of our invention, therefore, to provide an improved process by which frothing of the resin during the curing operation will be prevented without the necessity for employing pressure above atmospheric and whereby a smoothly finished product will be obtained having a continuous, completely sealed, outer surface film of substantially even thickness and texture throughout. It is important that the finished articles be free of any rough or uneven patches on the surface not only from the standpoint of appearance and sealing but also from the standpoint of the resiliency and the strength of the finished product, the product being of inferior grade from practically every standpoint if frothing is permitted during the curing operation.

We are claiming by this application that part of our improved process relating to the removal of the surplus resin by a chemical process the steps of which are so coordinated with the impregnating operation as a whole as to have no undesirable effect on that operation and as to enable us to effect the desired curing without frothing of the resin and without the use of pressure during the curing operation. The steps of our impregnating process apart from the removal of the surplus resin are claimed in our copending application Serial No. 15,899 of even date herewith.

It is one of the objects of our invention to effect the removal of the surplus resin from the surface of the impregnated articles by a chemical action effected at an intermediate stage of the impregnating operation and so regulated with respect to the agents employed and the method of their application as to have no deleterious effect on the impregnating operation.

It is another object of our invention to improve processes of this type in sundry details hereinafter pointed out. That which we believe to be new and desire to cover by Letters Patent is set forth in the claims.

The drawing shows diagrammatically one arrangement of parts by which our invention may be carried out.

By the practice of the process of impregnating articles of wood or other fibrous material with a suitable resinous solution as set forth in our aforesaid copending application, the resin is carried into the pores of the wood to the desired depth below the surface by means of a suitable liquid vehicle, preferably comprising water and a solvent such as methyl alcohol, under a vacuum and/or a pressure substantially above atmospheric, and at temperatures ranging from about 40° to about 60° C. Under such conditions, notwithstanding the presence of methyl alcohol or other suitable solvent, polymerization of the resin in the solution takes place at least to some extent, with the result that the resin accumulates or builds up on the surfaces of the articles and such surplus resin must be removed before subjecting the articles to the curing operation.

In the practice of the invention forming the subject-matter of our present application, we bring the impregnated articles after they come from the impregnating operation into contact with a suitable solvent of the resinous material preferably at a temperature a few degrees below the boiling point of the solvent. Preferably the impregnated articles are immersed in a bath of methyl alcohol heated to a temperature of about 62° C., and the articles are moved around in the alcohol in order to loosen and dislodge the surface resin, this being readily effected when carried out immediately following the impregnating operation since at that time polymerization of the resin has not progressed to any great extent. After the surplus resin has been removed in this manner from their surfaces, the articles are taken out of the alcohol bath and the surplus alcohol on the surfaces of the articles is then permitted to evaporate or is removed promptly by additional treatment preparatory to the curing operation so that the alcohol will not interfere with or retard such operation.

Additional quantities of the solvent are added from time to time to offset the action resulting from the additional amounts of resin that are being continually added in effecting a removal of the resin from the surfaces of the articles. The solvent adhering to the surfaces of the articles should be reduced to a negligible quantity. If the resin in the aforesaid solvent is not permitted to exceed about 30% by weight of the whole and the solvent is used at a temperature a few degrees below its boiling point, no further treatment will usually be required, as the small amount of solvent in such case adhering to the surfaces of the articles will readily evaporate. However, when conditions are other than as stated, it is advisable to employ special means to remove the surplus solvent as by immersing the articles in a still hotter bath of an agent adapted to extract the alcohol. We have found that satisfactory results are attained by the use of dipentene at a temperature a few degrees above the boiling point of the solvent, for example, at a temperature of about 72° C. when methyl alcohol is the solvent. When dipentene is used at the temperature stated it functions efficiently in extracting the alcohol yet the temperature of the dipentene is not high enough to cause it to evaporate too rapidly.

As we have pointed out, the methyl alcohol bath employed for removing the surplus resin will gradually become less effective for dissolving the resin as more and more of the resin is carried into solution therein. We prefer to remove a portion of the resin in the solution from time to time and to replace it with fresh alcohol, the alcohol content of the mixture removed from the bath being then separated from the resin for renewed use in the process. For carrying out our invention, including the recovery of the resin from the aforesaid solution, we have provided an improved arrangement of apparatus which will now be described.

Referring to the drawing, 10 and 11 indicate two steam jacketed tanks each having a steam coil 12 therein, said coils being connected at their lower ends with a steam pipe 13 from any suitable source of steam and having a shut-off valve 14 interposed therein. Heat controlled drain valves or traps 15 and 16 are connected with the coils 12 respectively adapted for draining condensate from the coils when the temperature at the valves falls substantially below 100° C. The upper ends of the coils 12 preferably open into the jacket spaces which are preferably kept filled with a heating medium such as water, an overflow pipe 17 being provided for such jacket spaces near the upper ends of the tanks.

In the arrangement shown, the tank or kettle 10 is filled with dipentene, being connected by a pipe 18 with a storage tank 19 containing a supply of dipentene, a shut-off valve 20 being interposed in said line of piping 18 for controlling the flow of the dipentene by gravity from the tank 19 to the tank 10.

The tank 11 is filled with methyl alcohol, being connected by a pipe 21 with a storage tank 22 containing a supply of the alcohol, a shut-off valve 23 being interposed in said line of piping 21 for controlling the flow of the alcohol by gravity from the tank 22 to the tank 11.

The tank 11 is also connected by a pipe 24 with a concentrator 25, a shut-off valve 26 being interposed in said line of piping 24 for controlling the flow of fluid from the tank to the concentrator and for preventing the flow of fluid in the reverse direction by gravity when the apparatus is not in operation.

The concentrator 25 as shown comprises an inner shell 27 and an outer shell 28 at its lower end portion, having a steam coil 29 located in the space between said shells, said coil being provided with a heat controlled drain trap 30 and a shut-off valve 30a at its lower end and being connected at its upper end with a steam pipe 31 having a shut-off valve 31a therein. A water pipe 32 having a shut-off valve 32a therein leads from the water supply to the space around the steam coil. A cover plate 33 serves effectively to close the concentrator, such cover plate having a vertical shaft 34 journaled therein with an agitator 35 mounted on its lower end and a driving pulley 36 mounted on its upper end above the cover plate. A pressure gauge 37 of any approved type is connected with the upper end portion of the concentrator.

A worm condenser 38 is connected at its upper end with the concentrator and at its lower end with a receptacle 39 which in turn is connected with a reflux condenser 40, the upper end of which is connected with a pipe 41 leading to a vacuum pump of any approved type. The arrangement is such that the vacuum pump is effective through the condenser 40, the receptacle 39, the condenser 38, and the concentrator 25 for drawing the alcohol and resin solution from the tank 11 into the concentrator when the valve 26 is opened. The receptacle 39 is connected with the tank 22 by a pipe 42 having a shut-off valve 43 therein.

Below the concentrator 25, we have provided a tank 44, connected with the concentrator by a pipe 45 having a shut-off valve 46 therein, the tank being provided with an outlet pipe 47 at its lower portion having a valve 48 therein.

With the tanks 10 and 11 and the concentrator 25 heated to the desired degree by the steam coils 12 and 29, and with the tanks filled with dipentene and methyl alcohol respectively substantially as shown, we immerse the articles being treated in the tank 11 as they come from the impregnating receptacle, moving the articles about in the alcohol to the necessary extent for effectively removing the surplus resin from their surfaces. The articles are then immersed in the dipentene in the tank 10, whereupon the articles are ready for the curing operation. As is set forth in our copending application referred to above, we prefer to employ for the impregnating operation a solution of methyl alcohol and a base material comprising phenol-formaldehyde condensation products reduced to a point where 20% to 25% of such base material is water, the formation of such condensation products being controlled so as to produce resins which are adapted to become hard and insoluble. We have found in practice that, when wooden articles impregnated with such a solution are immersed in methyl alcohol for removing the surface resin and are then immersed in dipentene for the removal of the surplus alcohol under substantially the conditions as above set forth, the resins in the wood are adapted to cure and harden so as to be made insoluble without any frothing of the resin during the curing operation even when the curing operation is carried out without the use of any pressure on the articles other than the ordinary atmospheric pressure.

After the immersion of the impregnated articles has continued to the point where there is a considerable quantity of resin in solution in the alcohol in the tank 11, the valve 26 is opened for the removal of a portion of the solution from the tank 11 by the action of the suction pump connected with the pipe 41. After the desired amount of alcohol and resin has been drawn by suction out of the tank 11, the valve 26 is closed, and the valve 23 is opened for refilling the tank 11 to the desired level therein with alcohol, after which the operations at the tanks 10 and 11 may proceed.

When a quantity of resin for concentration and alcohol for recovery are delivered to the concentrator 25, the agitator 35 is rotated through the medium of the pulley 36 and the degree of pressure in the concentrator is controlled as may be desired through the medium of the pump connected with the pipe 41. Under the influence of heat, agitation, and reduced pressure, the alcohol is drawn off quite rapidly and collected in condensed form in the receptacle 39 for delivery to the tank 22 through the valve 43. The resin is also concentrated to the desired degree for transfer to the tank 44 through the valve 46. If the concentration becomes too rapid and violent, the steam connection to the coil 29 is closed and cold water is delivered to the water jacket through the pipe 32 serving very quickly to slow up the process to the desired extent.

By proper setting of the valves 26 and 23 and proper operation of the concentrator 25 and condensers 38 and 40, the operation of withdrawing the resin-alcohol solution from the tank 11, separating the resin and the alcohol, and returning the alcohol to said tank may be carried out continuously.

In lieu of methyl alcohol as the solvent for removing the surplus resin on the surfaces of the articles, other suitable agents, either separately or in combination with each other, may be used such as ethyl alcohol, isopropyl alcohol, acetone or mono-methyl ether of ethylene glycol. We prefer to use the same alcohol for removing the surplus resin in carrying out our present invention as that used in the vehicle for introducing the resin into the pores of the articles treated according to the invention of our said copending application. In any event, the solvent used in the removal of the surplus resin should have a boiling point at least as high as that used in the aforesaid vehicle.

We have also found that agents other than dipentene may be employed for extracting the alcohol. As substitutes for dipentene other cyclic terpenes having the formula $C_{10}H_{15}$ may be employed, also other agents such as commercial spirits of turpentine, perilla oil, commercial fish oil or sperm oil may be used. The aforesaid extracting agents may be used separately or in combination with each other.

While we prefer to practice our invention without substantial departure therefrom as hereinabove set forth, it is to be understood that our invention is not limited thereto as we are aware that various changes may be made without departing from the spirit of our inveniton as defined by the appended claims.

We claim:—

1. In a process of the class described, the step of removing surplus synthetic resinous material of the phenol-formaldehyde A type from the surfaces of articles of wood or the like which have been impregnated with the material and before the material has become insoluble which consists in treating the articles with a solvent at a temperature a few degrees below its boiling point adapted to have a dissolving and removing action on the surplus resinous material and containing not more than about 30% by weight of said material.

2. In a process of the class described, the step of removing surplus synthetic resinous material of the phenol-formaldehyde A type from the surfaces of articles of wood or the like which have been impregnated with the material and before the material has become insoluble which consists in immersing the articles in a bath of a solvent heated to a temperature a few degrees below its boiling point and adapted to have a dissolving and washing away action on the surplus resinous material and containing not more than about 30% by weight of said material.

3. In a process of the class described, the step of removing surplus synthetic resinous material of the phenol-formaldehyde A type from the surfaces of articles of wood or the like which have been impregnated with the material and before the material has become insoluble which consists in treating the articles with a solvent at a temperature a few degrees below its boiling point selected from the group consisting of methyl alcohol, ethyl alcohol, isopropyl alcohol, acetone and mono-methyl ether of ethylene glycol for dissolving and removing the surplus resinous material, the solvent containing not more than about 30% by weight of the resinous material.

4. In a process of the class described, the step of removing surplus synthetic resinous material of the phenol-formaldehyde A type from the surfaces of articles of wood or the like which have been impregnated with the material and before the material has become insoluble which consists in immersing the articles in a bath of a solvent selected from the group consisting of methyl alcohol, ethyl alcohol, isopropyl alcohol, acetone and mono-methyl ether of ethylene glycol and heated to a temperature a few degrees below its boiling point for dissolving and washing away the surplus resinous material, the solvent containing not more than about 30% by weight of the resinous material.

5. In a process of the class described, the steps of removing surplus synthetic resinous material of the phenol-formaldehyde A type from the surfaces of articles of wood or the like which have been impregnated with the material and before the material has become insoluble which consists in treating the articles with a solvent adapted to have a dissolving and removing action on the surplus resinous material, and then treating the articles with an agent adapted to have an extracting action on the solvent remaining on the articles.

6. In a process of the class described, the steps of removing surplus synthetic resinous material of the phenol-formaldehyde A type from the surfaces of articles of wood or the like which have been impregnated with the material and before the material has become insoluble which consists in immersing the articles in a heated bath of a solvent adapted to have a dissolving and washing away action on the surplus resinous material, and then immersing the articles in a heated bath of an agent adapted to have an extracting action on the solvent remaining on the articles.

7. In a process of the class described, the steps of removing surplus synthetic resinous material of the phenol-formaldehyde A type from the surfaces of articles of wood or the like which have been impregnated with the material and before the material has become insoluble which consists in immersing the articles in a bath of a solvent heated to a temperature a few degrees below its boiling point and adapted to have a dissolving and washing away action on the surplus resinous material, and then immersing the articles in a bath of an agent at a temperature above the boiling point of the solvent and adapted to have an extracting action on the solvent remaining on the articles.

8. In a process of the class described, the steps of removing surplus synthetic resinous material of the phenol-formaldehyde A type from the surfaces of articles of wood or the like which have been impregnated with the material and before the material has become insoluble which consists in treating the articles with a solvent adapted to have a dissolving and removing action on the surplus resinous material, and then treating the articles with an agent selected from the group consisting of cyclic terpenes have the formula $C_{10}H_{16}$, commercial spirits of turpentine, perilla oil, commercial fish oil and sperm oil for extracting the solvent remaining on the articles.

9. In a process of the class described, the steps of removing surplus synthetic resinous material of the phenol-formaldehyde A type from the surfaces of articles of wood or the like which have been impregnated with the material and before the material has become insoluble which consists in immersing the articles in a heated bath of a solvent adapted to have a dissolving and washing away action on the surplus resinous material, and then immersing the articles in a heated bath of an agent selected from the group consisting of cyclic terpenes having the formula $C_{10}H_{16}$, commercial spirits of turpentine, perilla oil, commercial fish oil and sperm oil for extracting the solvent remaining on the articles.

10. In a process of the class described, the steps of removing surplus synthetic resinous material of the phenol-formaldehyde A type from the surfaces of articles of wood or the like which have been impregnated with the material and before the material has become insoluble which consists in immersing the articles in a bath of a solvent heated to a temperature a few degrees below its boiling point and adapted to have a dissolving and washing away action on the surplus resinous material, and then immersing the articles in a bath of an agent at a temperature above the boiling point of the solvent and selected from the group consisting of cyclic terpenes having the formula $C_{10}H_{16}$, commercial spirits of turpentine, perilla oil, commercial fish oil and sperm oil for extracting the solvent remaining on the articles.

11. In a process of the class described, the steps of removing surplus synthetic resinous material of the phenol-formaldehyde A type from the surfaces of articles of wood or the like which have been impregnated with the material and before the material has become insoluble which consists in treating the articles with a solvent selected from the group consisting of methyl alcohol, ethyl alcohol, isopropyl alcohol, acetone and mono-methyl ether of ethylene glycol for dissolving and removing the surplus resinous material, and then treating the articles with an agent selected from the group consisting of cyclic terpenes having the formula $C_{10}H_{16}$, commercial spirits of turpentine, perilla oil, commercial fish oil and sperm oil for extracting the solvent remaining on the articles.

12. In a process of the class described, the steps of removing surplus synthetic resinous material of the phenol-formaldehyde A type from the surfaces of articles of wood or the like which have been impregnated with the material and before the material has become insoluble which consists in immersing the articles in a heated bath of a solvent selected from the group consisting of methyl alcohol, ethyl alcohol, isopropyl alcohol, acetone and mono-methyl ether of ethylene glycol for dissolving and washing away the surplus resinous material, and then immersing the articles in a heated bath of an agent selected from the group consisting of cyclic terpenes having the formula $C_{10}H_{16}$, commercial spirits of turpentine, perilla oil, commercial fish oil and sperm oil for extracting the solvent remaining on the articles.

13. In a process of the class described, the steps of removing surplus synthetic resinous material of the phenol-formaldehyde A type from the surfaces of articles of wood or the like which have been impregnated with the material and before the material has become insoluble which consists in immersing the articles in a bath of a solvent selected from the group consisting of methyl alcohol, ethyl alcohol, isopropyl alcohol, acetone and methyl cello-solve and heated to a temperature a few degrees below its boiling point for dissolving and washing away the surplus resinous material, and then immersing the articles in a bath of an agent selected from the group consisting of cyclic terpenes having the formula $C_{10}H_{16}$, commercial spirits of turpentine, perilla oil, commercial fish oil and sperm oil and at a temperature above the boiling point of the solvent for extracting the solvent remaining on the articles.

PHILIP C. P. BOOTY.
RAYMOND G. BOOTY.